United States Patent [19]

Hongo et al.

[11] Patent Number: 4,879,329

[45] Date of Patent: Nov. 7, 1989

[54] IMPACT RESISTANT FLAME-RETARDANT RESIN COMPOSITION

[75] Inventors: Masafumi Hongo, Hatsukaichi; Mitsuaki Noda, Ohtake, both of Japan

[73] Assignee: Mitsubishi Rayon Company Ltd., Tokyo, Japan

[21] Appl. No.: 259,536

[22] Filed: Oct. 18, 1988

[51] Int. Cl.$^4$ ............................ C08K 5/13; C08K 5/06
[52] U.S. Cl. ..................................... 524/114; 524/334; 524/339; 524/341; 524/411; 524/412
[58] Field of Search ............... 524/411, 412, 114, 334, 524/339, 341

[56] References Cited

U.S. PATENT DOCUMENTS

| | | | |
|---|---|---|---|
| 4,221,893 | 9/1980 | Behar et al. | 525/438 |
| 4,417,018 | 11/1983 | Ogawa et al. | 524/412 |
| 4,707,510 | 11/1987 | Imai et al. | 524/373 |
| 4,732,921 | 3/1988 | Hochberg et al. | 525/438 |

FOREIGN PATENT DOCUMENTS

| | | |
|---|---|---|
| 2757557 | 6/1978 | Fed. Rep. of Germany . |
| 52-19231 | 5/1977 | Japan . |
| 54-15954 | 2/1979 | Japan . |
| 55-12163 | 1/1980 | Japan . |
| 61-241343 | 10/1986 | Japan . |

*Primary Examiner*—Veronica P. Hoke
*Attorney, Agent, or Firm*—Oblon, Spivak, McClelland, Maier & Neustadt

[57] ABSTRACT

An impact resistant flame-retardand resin composition comprising:
  100 parts by weight of a polymer mixture comprising a polycarbonate resin (A), a rubber-reinforced vinyl copolymer (B) and, optionally, a vinyl polymer (C);
  from 3 to 50 parts by weight of a high molecular weight halogenated compound of the following formula I having a halogen content of at least 10% by weight:

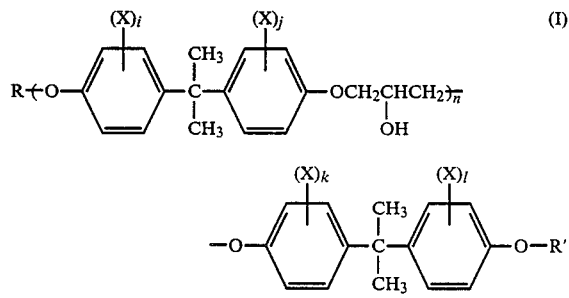

wherein n is an average polymerization degree of from 35 to 100, each X independently represents hydrogen, chlorine or bromine, each of i, j, k and l is an integer of from 1 to 4, and each of R and R' independently is hydrogen, a methyl group, an epoxypropyl group, a phenyl group or

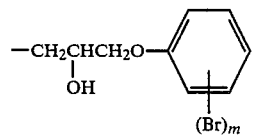

wherein m is 0, 1, 2 or 3; and from 2 to 30 parts by weight of an antimony compound.

7 Claims, No Drawings

IMPACT RESISTANT FLAME-RETARDANT RESIN COMPOSITION

The present invention relates to an impact resistant flame-retardant resin composition composed essentially of a polycarbonate resin and a rubber-reinforced vinyl copolymer.

A polycarbonate resin has excellent mechanical properties and heat resistance. It is well known that the impact resistance can be improved to a large extent by incorporating a rubber-reinforced resin such as an ABS resin or an AAS resin to such a polycarbonate resin. However, a blend composition comprising a polycarbonate resin and a rubber-reinforced resin is flammable under a normal condition, and it is essential to impart flame-retardancy to make it widely useful for e.g. electrical parts.

Various proposals have been made for imparting flame retardancy to a polycarbonate resin, to an ABS resin or to a mixture of a polycarbonate resin and an ABS resin. Such proposals are directed to use of various halogenated compounds or a combination thereof with an antimony compound. For example, Japanese Unexamined Patent Publications Nos. 15954/1979 and 12163/1980 and Japanese Examined Patent Publication No. 19231/1977, may be mentioned. Such proposals are successful in imparting the flame retardancy, but tend to deteriorate the excellent impact resistance inherent to the mixture of the polycarbonate resin and the rubber-reinforced resin. For this reason, such proposals are not practically useful for electrical parts or automobile parts where high impact resistance and flame retardancy are required.

For example, Japanese Unexamined Patent Publication No. 15954/1979 proposes to use a halogenated bisphenol A-type epoxy oligomer to impart flame retardancy to a polycarbonate resin. However, in the case of a polycarbonate resin, the impact resistance tends to decrease as the polymerization degree of such an epoxy compound increases.

Japanese Unexamined Patent Publication No. 27843/1980 proposes to incorporate an epoxy compound to an AAS resin in a similar manner. Also in this case, the impact resistance tends to decrease as an epoxy compound having a high degree of polymerization is incorporated.

Under these circumstances, the present inventors have conducted extensive researches with an aim to impart the flame retardancy without sacrificing the heat resistance and impact resistance of the polycarbonate resin-rubber-reinforced copolymer mixture system. As a result, it has been unexpectedly found that by using a high molecular weight halogenated compound which is capable of providing only a composition having very poor impact resistance when incorporated to a polycarbonate resin or to a rubber-reinforced resin independently to impart flame retardancy, it is possible to obtain a composition having excellent impact resistance with a system where the polycarbonate and the rubber-reinforced resin are combined. The present invention has been accomplished on the basis of this discovery.

Thus, the present invention provides an impact resistant flame-retardant resin composition comprising:

100 parts by weight of a polymer mixture comprising a polycarbonate resin (A), a rubber-reinforced vinyl copolymer (B) and, optionally, a vinyl polymer (C); from 3 to 50 parts by weight of a high molecular weight halogenated compound of the following formula I having a halogen content of at least 10% by weight:

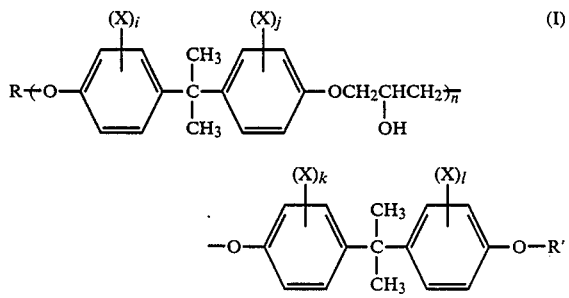

wherein n is an average polymerization degree of from 35 to 100, each X independently represents hydrogen, chlorine or bromine, each of i, j, k and l is an integer of from 1 to 4, and each of R and R' independently is hydrogen, a methyl group, an epoxypropyl group, a phenyl group or

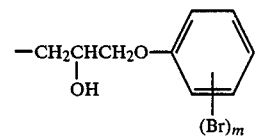

wherein m is 0, 1, 2 or 3; and from 2 to 30 parts by weight of an antimony compound.

Now, the present invention will be described in detail with reference to the preferred embodiments.

As the resin (A), a 4,4'-dioxydiarylalkane polycarbonate may be mentioned. Particularly preferred is a polycarbonate of 2,2'-(4,4'-dihydroxydiphenyl)propane. A small amount of a polyterephthalate-carbonate copolymer may be incorporated. The polycarbonate resin may be prepared by either the phosgene method or the ester exchange method.

The rubber-reinforced vinyl copolymer (B) includes a copolymer obtained by polymerizing at least one copolymerizable monomer selected from the group consisting of an acrylate monomer, a methacrylate monomer, a vinyl cyanide monomer and an aromatic vinyl monomer in the presence of at least one rubber component selected from the group consisting of a butadiene rubber component, an acrylic rubber component, an ethylene-propylene rubber component and a silicone-rubber component, or a compound rubber component composed of at least two such rubber components. Such a copolymer can be prepared by either bulk polymerization, suspension polymerization, emulsion polymerization or a combination thereof. It is particularly preferred that the rubber component and the vinyl polymer together form a graft structure.

The butadiene rubber component may be a polybutadiene, a butadiene-styrene copolymer or a butadiene-acrylonitrile copolymer. The acrylic rubber component may be an elastomeric polymer obtained by polymerizing an acrylate monomer such as ethyl acrylate, butyl acrylate or 2-ethylhexyl acrylate, or a monomer mixture composed essentially of such an acrylate monomer. The ethylene propylene rubber component preferably has an ethylene/propylene ratio of from 80/20 to 50/50 and may further contain butadiene. The silicone rubber component may be a polyorganosiloxane rubber component which has repeating units of dimethylsiloxane.

Further, a compound rubber comprising a silicone rubber component and an acrylic rubber component, or a compound rubber comprising a butadiene rubber component and an acrylic rubber component may preferably be used.

The vinyl polymer (C) to e used as the case requires, includes a polymer obtained by polymerizing at least one monomer selected from the group consisting of an aromatic vinyl monomer such as styrene, α-methylstyrene or trimethylstyrene, an acrylate monomer, a methacrylate monomer and a vinyl cyanide monomer. Further, it may be a copolymer of such a monomer with a small amount of a copolymerizable monomer such as N-phenyl maleimide.

These components (A), (B) and (C) may be blended in optional proportions. However, the polymer mixture preferably comprises from 10 to 90% by weight of component (A), from 10 to 90% by weight of component (B) and from 0 to 60% by weight of component (C). When the proportion of the rubber component in component (B) is relatively high, it is preferred to incorporate component (C) from the viewpoint of the moldability and heat resistance.

The high molecular weight halogenated compound to be used as a flame retardant in the present invention is a compound of the following formula I having a halogen content of at least 10% by weight:

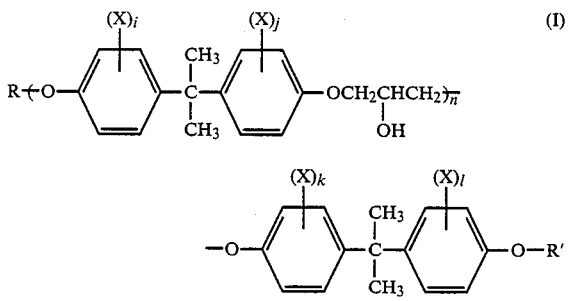

wherein n is an average polymerization degree, and it is important that n is from 35 to 100. When incorporated to the polycarbonate resin alone or to a rubber reinforced resin alone, the lower the average polymerization degree n, the better the impact resistance, and when n is high at a level of 35, the impact resistance tends to be extremely poor. Whereas with the resin composition of the resent invention, it has surprisingly been found that the excellent impact resistance of the compound system of the polycarbonate resin and the rubber-reinforced resin can be effectively utilized for the first time at a high level of the polymerization degree.

In the formula I, each X independently represents hydrogen, chlorine or bromine, and each of i, j, k and l is an integer of from 1 to 4.

Each of R and R' is independently hydrogen, a methyl group, an epoxypropyl group of the formula $$-CH_2CH-CH_2,$$
$$\diagdown O \diagup$$

a phenyl group or

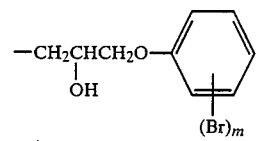

wherein m is 0, 1, 2 or 3. Namely, both terminals may not necessarily be epoxy groups, and it is possible to employ the compound having the terminals modified.

The blending proportion of such a high molecular weight halogenated compound varies depending upon the desired degree of flame retardancy, but is usually within a range of from 3 to 50 parts by weight relative to 100 parts by weight of the entire polymer mixture of components (A), (B) and, optionally, (C). If it is less than 3 parts by weight, the effect for flame retardancy tends to be low, and if it exceeds 50 parts by weight, the mechanical properties tend to deteriorate.

As the antimony compound to be used in the present invention, antimony trioxide, antimony pentoxide or sodium antimonate may be mentioned. Further, such materials are commercially available in the form such that they have been subjected to various surface treatments, and such surface treated materials may also be used.

The blending proportion of such an antimony compound is usually within a range of from 2 to 30 parts by weight relative to 100 parts by weight of the entire polymer mixture. If it is less than 2 parts by weight, the effect for flame retardancy tends to be inadequate. On the other hand, if it exceeds 30 parts by weight, the mechanical properties tend to deteriorate.

There is no particular restriction as to the method for the preparation of the impact resistant flame-retardant resin composition. For example, the polycarbonate resin, the rubber-reinforced vinyl copolymer, the vinyl polymer, the high molecular weight halogenated compound and the antimony compound may be mixed by a Henschel mixer and then melt-kneaded by a single-screw or twin-screw extruder.

To such a resin composition of the present invention, various additives such as a stabilizer, a releasing agent, a pigment or dyestuff, and a reinforcing agent such as glass fibers, may be incorporated as the case requires.

Now, the present invention will be described in detail with reference to Examples. However, it should be understood that the present invention is by no means restricted to such specific Examples.

In the Examples "parts" means "parts by weight".

EXAMPLE 1

(1) Preparation of flame-retardant

Five flame-retardants represented by the following formulas and having average polymerization degrees n of 1, 6, 20, 35 and 70, respectively, were prepared by using tetrabromobisphenol A, epichlorohydrin and tetrabromobisphenol A diglycidyl ether and using lithium hydroxide as the catalyst:

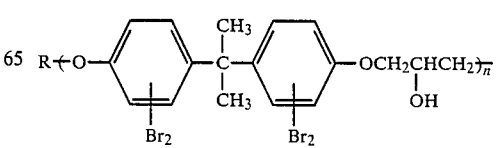

-continued

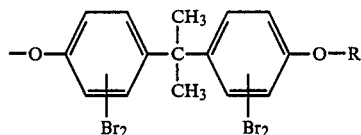

wherein each of R and R' is hydrogen or

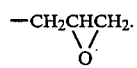

(2) Preparation of resin composition

A bisphenol A type polycarbonate resin having an average molecular weight of 22,000, an ABS resin having a weight ratio of acrylonitrile/butadiene/styrene of 23/18/59, antimony trioxide and the above-mentioned halogenated flame-retardant were mixed in the proportions as identified in Table 1, and the mixture was mixed by a Henschel mixer for 3 minutes and then melt-kneaded by a 30 mm twin-screw extruder at a cylinder temperature of from 220° to 250° C. and formed into pellets. Thus, various resin compositions were prepared. The pellets were formed into test pieces for various evaluations, by an injection molding machine M-100 model manufactured by Meiki Seisakusho at a cylinder temperature of 240° C. and a mold temperature of 60° C. and then evaluated. The results are shown also in Table 1. Nos. 1 to 3 represent a case wherein the halogenated flame-retardant was added to a system of the polycarbonate resin alone. Likewise, Nos. 4 to 8 represent a case wherein the halogenated flame-retardant was added to a system of the ABS resin alone. In these cases, the impact resistance decreased as the average polymerization degree of the flame-retardant increased. Whereas, in Nos. 9 to 16 representing a case where the polycarbonate resin and the rubber-reinforced resin were compounded, the behavior was different. Namely, Nos. 13, 14 and 16 wherein a flame-retardant having a high level of the average polymerization degree of the present invention was used, showed impact resistance remarkably higher than the low molecular weight type having the same structure. Thus, it is possible to provide a high level of flame-retardancy (V-0) to solve the problem of the flammability of the polycarbonate resin-rubber-reinforced resin compound system, while maintaining the excellent heat resistance and impact resistance specific to such a compound system.

TABLE 1

| | Composition | | | | | Izod impact strength ASTM D-256 ¼" notched (kg·cm/cm) | Vicat softening temp. ISO R306 5 kg load (°C.) | Flame-retardancy VL 94 1/12" |
|---|---|---|---|---|---|---|---|---|
| | Poly-carbonate resin (parts) | ABS resin (parts) | Halogenated flame-retardant | | | | | |
| | | | Average polymerization degree n | (parts) | Antimony trioxide (parts) | | | |
| No. 1 | 100 | | 1 | 25 | 7 | 5.3 | 128 | V-0 |
| No. 2 | 100 | | 6 | 25 | 7 | 4.8 | 128 | V-0 |
| No. 3 | 100 | | 70 | 25 | 7 | 4.7 | 130 | V-0 |
| No. 4 | | 100 | — | — | — | 30.5 | 95 | H B |
| No. 5 | | 100 | 1 | 25 | 7 | 8.2 | 96 | V-0 |
| No. 6 | | 100 | 6 | 25 | 7 | 5.7 | 98 | V-0 |
| No. 7 | | 100 | 20 | 25 | 7 | 5.1 | 102 | V-0 |
| No. 8 | | 100 | 35 | 25 | 7 | 4.2 | 103 | V-0 |
| No. 9 | 50 | 50 | — | — | — | 45.0 | 116 | H B |
| No. 10 | 50 | 50 | 1 | 25 | 7 | 30.5 | 115 | V-0 |
| No. 11 | 50 | 50 | 6 | 25 | 7 | 32.0 | 117 | V-0 |
| No. 12 | 50 | 50 | 20 | 25 | 7 | 28.8 | 119 | V-0 |
| No. 13 | 50 | 50 | 35 | 25 | 7 | 44.2 | 121 | V-0 |
| No. 14 | 50 | 50 | 70 | 25 | 7 | 48.0 | 121 | V-0 |
| No. 15 | 30 | 70 | 6 | 27 | 7 | 6.3 | 112 | V-0 |
| No. 16 | 30 | 70 | 70 | 27 | 7 | 18.4 | 116 | V-0 |

EXAMPLE 2

17 Parts of a halogenated compound as identified in Table 2 and 7 parts of antimony trioxide were blended to 30 parts by weight of the polycarbonate resin as used in Example 1, 20 parts of an ABS resin having a weight ratio of acrylonitrile/butadiene/styrene of 10/70/20 and 50 parts of an acrylonitrile-α-methylstyrene copolymer having an acrylonitrile content of 27%, and compositions were prepared and evaluated in the same manner as in Example 1. The results are shown also in Table 2. It is evident that excellent impact resistance and heat resistance are obtainable when the structure and the polymerization degree of the flame-retardant ar within the specific range of the present invention.

TABLE 2

| | Type of flame-retardant | Izod impact strength ASTM D-256 ¼" notched (kg·cm/cm) | Vicat softening temp. ISO R306 5 kg load (°C.) | Flame-retardancy UL94 1/12" |
|---|---|---|---|---|
| No. 17 | Flame-retardant having an average polymerization degree of 70 | 17.2 | 126 | V-0 |
| No. 18 | Flame-retardant having an average polymerization degree of 6 as used in Example 11 | 9.4 | 123 | V-0 |
| No. 19 | Tetrabromo-bisphenol A Carbonate oligomer of | 8.0 | 108 | V-2 |

TABLE 2-continued

| Type of flame-retardant | Izod impact strength ASTM D-256 ¼" notched (kg · cm/cm) | Vicat softening temp. ISO R306 5 kg load (°C.) | Flame-retardancy UL94 1/12" |
|---|---|---|---|
| No. 20 tetrabromo-bisphenol A Average polymerization degree: 5 | 8.8 | 126 | V-0 | polymerization degree were used instead of the flame-retardant of the present invention.

The molded products obtained from the resin compositions of the present invention exhibit excellent properties within a wide compositional range. When the required flame retardancy level is V-2 as in the case of No. 27, the amount of the flame-retardant may simply be reduced. Further, a thinner for coating material which causes cracks when applied to a polycarbonate resin, was applied to the test pieces of Nos. 21 to 26, whereby no cracks formed. Thus, the compositions of the present invention exhibited excellent chemical resistance.

TABLE 3

| | Composition | | | | | | | | |
|---|---|---|---|---|---|---|---|---|---|
| | Polycarbonate resin (parts) | Rubber-reinforced resin type (parts) | | Copolymer type (parts) | | Flame-retardant in No. 14 of Example 1 (parts) | $Sb_2O_3$ (parts) | Izod impact strength ASTM D-256 ¼" notched (kg · cm/cm) | Vicat softening temp. ISO R306 5 kg load (°C.) | Flame-retardancy UL 94 1/12" |
| No. 21 | 60 | A-1 | 40 | | | 25 | 6 | 55.0 | 121 | V-0 |
| No. 22 | 50 | A-1 | 30 | B-2 | 20 | 16 | 6 | 69.0 | 127 | V-0 |
| No. 23 | " | " | " | " | " | 12 | 5 | 50.1 | 127 | V-0 |
| No. 24 | " | A-2 | 25 | B-1 | 25 | 20 | 6 | 48.0 | 122 | V-0 |
| No. 25 | " | A-3 | 25 | B-1 | 25 | 16 | 6 | 52.7 | 125 | V-0 |
| No. 26 | 40 | A-1 | 30 | B-1 | 30 | 14 | 5 | 21.8 | 122 | V-0 |
| No. 27 | " | " | " | " | " | 10 | 3 | 21.5 | 120 | V-2 |
| No. 28 | " | " | " | " | " | 14(*1) | 5 | 3.2 | 98 | V-2 |
| No. 29 | " | " | " | " | " | 14(*2) | 5 | 8.2 | 113 | V-0 |
| No. 30 | 20 | A-2 | 25 | B-2 | 55 | 20 | 7 | 10.5 | 123 | V-0 |

(*1)Tetrabromobisphenol A, Teijin Kasei Fire Guard 2001
(*2)Flame-retardant of No. 11 of Example 1

EXAMPLE 3

The following copolymers were used as the rubber-reinforced resins.

(1) Copolymer A-1 obtained by graft-polymerizing a solution mixture of 14 parts of acrylonitrile and 41 parts of styrene to a rubber component obtained by polymerizing 36 parts of butyl acrylate in the presence of 9 parts (solid content) of a polybutadiene latex having a particle size of 0.3 μm.

(2) Copolymer A-2 obtained by graft-polymerizing 36 parts of methyl methacrylate in the presence of a rubber latex obtained by polymerizing 32 parts of butadiene and 32 parts of butyl acrylate.

(3) Copolymer A-3 obtained by graft-polymerizing a solution mixture of 9 parts of acrylonitrile and 21 parts of styrene to a rubber component obtained by polymerizing 40 parts of butyl acrylate in the presence of 30 parts (solid content) of polydimethylsiloxane rubber latex and having a particle size of 0.25 μm.

Copolymer A-1, A-2 or A-3, a bisphenol A type polycarbonate resin having an average molecular weight of 25,000, an acrylonitrile-styrene copolymer B-1 having an acrylonitrile content of 29% by weight, an acrylonitrile-α-methylstyrene copolymer B-2 having an acrylonitrile content of 27% by weight, the flame-retardant having an average polymerization degree of 70 as used in No. 14 of Example 1 as the flame-retardant and antimony trioxide were mixed in the proportions as identified in Table 3, and resin compositions of the present invention were prepared in the same manner as in Example 1. These resin compositions were injection-molded in the same manner as in Example 1 and evaluated. The results are shown also in Table 3. Nos. 28 and 29 represent a case wherein tetrabromobisphenol A and a flame-retardant having a low level of the average The impact resistant flame-retardant resin composition of the present invention is a flame-retardant material having a high level of impact resistance which has not ever been obtained and excellent heat resistance. It is an extremely useful material which can be used in the form of molded products per se or with a coating or plating applied thereto in a wide range of fields including electrical machines and equipments and automobile parts.

What is claimed is:

1. An impact resistant flame-retardand resin composition comprising:

100 parts by weight of a polymer mixture comprising a polycarbonate resin (A), a rubber-reinforced vinyl copolymer (B) and, optionally, a vinyl polymer (C);

from 3 to 50 parts by weight of a high molecular weight halogenated compound of the following formula I having a halogen content of at least 10% by weight:

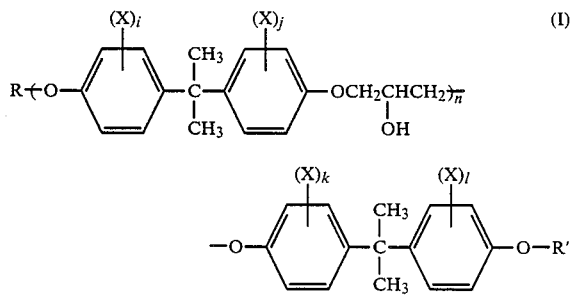

wherein n is an average polymerization degree of from 35 to 100, each X independently represents hydrogen, chlorine or bromine, each of i, j, k and l is an integer of from 1 to 4, and each of R and R' independently is hydrogen, a methyl group, an epoxypropyl group, a phenyl group or

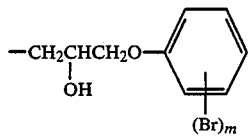

wherein m is 0, 1, 2 or 3; and from 2 to 30 parts by weight of an antimony compound.

2. The resin composition according to claim 1, wherein the polycarbonate resin (A) is a 4,4'-dioxydiarylalkane polycarbonate.

3. The resin composition according to claim 1, wherein the polycarbonate resin (A) is a polycarbonate of 2,2'-(4,4'-dihydroxydiphenyl)propane.

4. The resin composition according to claim 1, wherein the rubber-reinforced vinyl copolymer (B) is a copolymer obtained by polymerizing at least one copolymerizable monomer selected from the group consisting of an acrylate monomer, a methacrylate monomer, a vinyl cyanide monomer and an aromatic vinyl monomer in the presence of at least one rubber component selected from the group consisting of a butadiene rubber component, an acrylic rubber component, an ethylene-propylene rubber component and a silicone-rubber component, or a compound rubber component composed of at least two such rubber components.

5. The resin composition according to claim 1, wherein the optional vinyl polymer (C) is a polymer obtained by polymerizing at least one monomer selected from the group consisting of an aromatic vinyl monomer, an acrylate monomer, a methacrylate monomer and a vinyl cyanide monomer.

6. The resin composition according to claim 1, wherein the polymer mixture comprises from 10 to 90% by weight of component (A), from 10 to 90% by weight of component (B) and from 0 to 60% by weight of component (C).

7. The resin composition according to claim 1, wherein the antimony compound is antimony trioxide, antimony pentoxide or sodium antimonate.

* * * * *